United States Patent
Hongawa

(10) Patent No.: US 9,494,127 B2
(45) Date of Patent: Nov. 15, 2016

(54) PUMPED STORAGE POWER PLANT

(71) Applicant: Hitachi Mitsubishi Hydro Corporation, Tokyo (JP)

(72) Inventor: Yukio Hongawa, Tokyo (JP)

(73) Assignee: HITACHI MITSUBISHI HYDRO CORPORATION, Tokyo (JP)

(*) Notice: Subject to any disclaimer, the term of this patent is extended or adjusted under 35 U.S.C. 154(b) by 284 days.

(21) Appl. No.: 14/460,882

(22) Filed: Aug. 15, 2014

(65) Prior Publication Data

US 2015/0176559 A1    Jun. 25, 2015

(30) Foreign Application Priority Data

Dec. 24, 2013   (JP) .................................. 2013-266140

(51) Int. Cl.
   *F03B 13/06*    (2006.01)
   *F03B 3/10*     (2006.01)
   *F03B 15/14*    (2006.01)

(52) U.S. Cl.
   CPC ................ *F03B 13/06* (2013.01); *F03B 3/10* (2013.01); *F03B 15/14* (2013.01);
   (Continued)

(58) Field of Classification Search
   CPC ............ E02B 9/00; F03B 13/06; F03D 9/007; F03D 9/008; Y02E 10/22; Y02E 10/72; Y02E 60/17
   (Continued)

(56) References Cited

U.S. PATENT DOCUMENTS

| 3,677,008 A * | 7/1972 | Koutz | ..................... F02C 6/16 290/52 |
| 3,796,051 A * | 3/1974 | Kuwabara | ............... F03B 15/06 60/398 |

(Continued)

FOREIGN PATENT DOCUMENTS

| DE | 10 2010 010 701 A1 | 9/2011 | |
| DE | 102010010701 A1 * | 9/2011 | ............... E02B 9/00 |

OTHER PUBLICATIONS

Office Action issued in corresponding German Application No. 10 2014 112 356.5, mailed on Jun. 23, 2015; 8 pages with English translation.

(Continued)

*Primary Examiner* — Thomas E Lazo
(74) *Attorney, Agent, or Firm* — McDermott Will & Emery LLP

(57) ABSTRACT

A pumped storage power plant performs a pumping operation by using a pump turbine, upper and lower regulating reservoirs. An upper space of one of the reservoirs is sealable. The pumped storage power plant detects an air pressure in the upper space, first and second water levels of the one and the other reservoirs. A controller of the pumped storage power plant obtains information of the detected air pressure, first and second water levels, and an electrical energy input from an external grid and used during the pumping operation. A calculation water level of the one reservoir is calculated by using the first water level and the air pressure. The controller adjusts the air pressure such that a difference between the second water level and the calculation water level becomes a desired difference that is determined by a characteristic of the pump turbine depending on the input electrical energy.

16 Claims, 3 Drawing Sheets

(52) U.S. Cl.
CPC .......... *F05B 2270/301* (2013.01); *Y02E 10/22* (2013.01); *Y02E 10/223* (2013.01); *Y02E 10/226* (2013.01); *Y02E 60/17* (2013.01)

(58) Field of Classification Search
USPC ......................................................... 60/398
See application file for complete search history.

(56) References Cited

U.S. PATENT DOCUMENTS

| | | | | | |
|---|---|---|---|---|---|
| 3,939,356 | A | * | 2/1976 | Loane | F02C 6/16 |
| | | | | | 290/52 |
| 3,953,971 | A | * | 5/1976 | Parker | F03G 7/04 |
| | | | | | 165/45 |
| 3,996,741 | A | * | 12/1976 | Herberg | F03D 9/17 |
| | | | | | 405/53 |
| 4,182,128 | A | * | 1/1980 | Gardner | F03B 13/06 |
| | | | | | 60/398 |
| 4,739,182 | A | * | 4/1988 | Kenderi | F03B 13/148 |
| | | | | | 290/53 |
| 7,281,371 | B1 | * | 10/2007 | Heidenreich | F03B 13/00 |
| | | | | | 60/398 |
| 2015/0091301 | A1 | * | 4/2015 | Littmann | H02P 9/04 |
| | | | | | 290/7 |

OTHER PUBLICATIONS

Vojeslav Turel et al., "Implementation of a Variable Speed Unit in the AVCE PSPP", Hydro, 2008, 8 pages.

\* cited by examiner

PUMPED STORAGE POWER PLANT

CROSS-REFERENCE TO RELATED APPLICATIONS

The present application claims priority to and incorporates by reference the entire contents of Japanese Patent Application No. 2013-266140 filed in Japan on Dec. 24, 2013.

BACKGROUND OF THE INVENTION

1. Field of the Invention

The present invention relates to a pumped storage power plant.

2. Description of the Related Art

In a conventional pumped storage power plant, a power generation operation and a pumping operation are carried out by utilizing a difference in a geographical water level between two regulating reservoirs (an upper regulating reservoir and a lower regulating reservoir) whose water surfaces are open to the atmosphere. In some cases, one of the regulating reservoirs is underground. Even in this case, the underground regulating reservoir is configured such that the water surface thereof is open to the atmosphere in the underground space.

In the pumping operation, the pumped storage power plant pumps up water in the lower regulating reservoir to the upper regulating reservoir to convert an electrical energy as a pumping input into a potential energy of the water and thereby store the energy. Here, an electrical energy consumed by pumping up the water in the pumping operation is determined depending on a characteristic of a pump turbine used in the pumped storage power plant and a water level difference between the water level of the upper regulating reservoir and the water level of the lower regulating reservoir.

A conventional pumped storage power plant is disclosed in the following Non-Patent Literature 1: Turel, V., F. Prime, and T. Machino, "Implementation of a Variable Speed Unit in the AVCE PSPP", Hydro 2008.

According to the above-mentioned conventional technique, an electrical energy used for pumping up the water in the pumping operation is input as the pumping input from an external grid. A desired water level difference between the water level of the upper regulating reservoir and the water level of the lower regulating reservoir required for consuming the pumping input can be determined by the characteristic of the pump turbine. However, an actual water level difference between the water level of the upper regulating reservoir and the water level of the lower regulating reservoir cannot be adjusted to the desired water level difference. Moreover, the pumping input that is input from the external grid is not necessarily constant but may change. Therefore, the pumping input may not be stably consumed in the pumping operation.

SUMMARY OF THE INVENTION

The present invention has been made in view of the above and an object thereof is to achieve a pumped storage power plant that can adjust a water level difference acting during a pumping operation between a water level of an upper regulating reservoir and a water level of a lower regulating reservoir.

A pumped storage power plant according to an aspect of the present invention performs a pumping operation by using a pump turbine, an upper regulating reservoir, and a lower regulating reservoir located at a position geographically lower than the upper regulating reservoir. An upper space of one of the upper regulating reservoir and the lower regulating reservoir is sealable. The pumped storage power plant has: an air pressure adjustment unit configured to adjust an air pressure in the upper space of the one regulating reservoir; a first water level detector configured to detect a first water level of the one regulating reservoir; an air pressure detector configured to detect the air pressure in the upper space of the one regulating reservoir; a second water level detector configured to detect a second water level of other of the upper regulating reservoir and the lower regulating reservoir; and a controller. The controller obtains information of the first water level from the first water level detector, information of the air pressure from the air pressure detector, information of the second water level from the second water level detector, and information of a pumping input that is an electrical energy input from an external grid and used during the pumping operation. The controller sets a water level calculated by using the first water level and the air pressure, as a regulating reservoir calculation water level of the one regulating reservoir. The controller controls the air pressure adjustment unit to adjust the air pressure such that a water level difference between the second water level and the regulating reservoir calculation water level becomes a desired water level difference that is determined by a characteristic of the pump turbine depending on the pumping input.

According to the present invention, it is possible to adjust a water level difference acting during the pumping operation between the water level of the upper regulating reservoir and the water level of the lower regulating reservoir.

DETAILED DESCRIPTION OF EMBODIMENTS

Hereinafter, embodiments of a pumped storage power plant according to the present invention will be described in detail with reference to the attached drawings. It should be noted that the present invention is not limited to the embodiments.

First Embodiment

Figure 1:
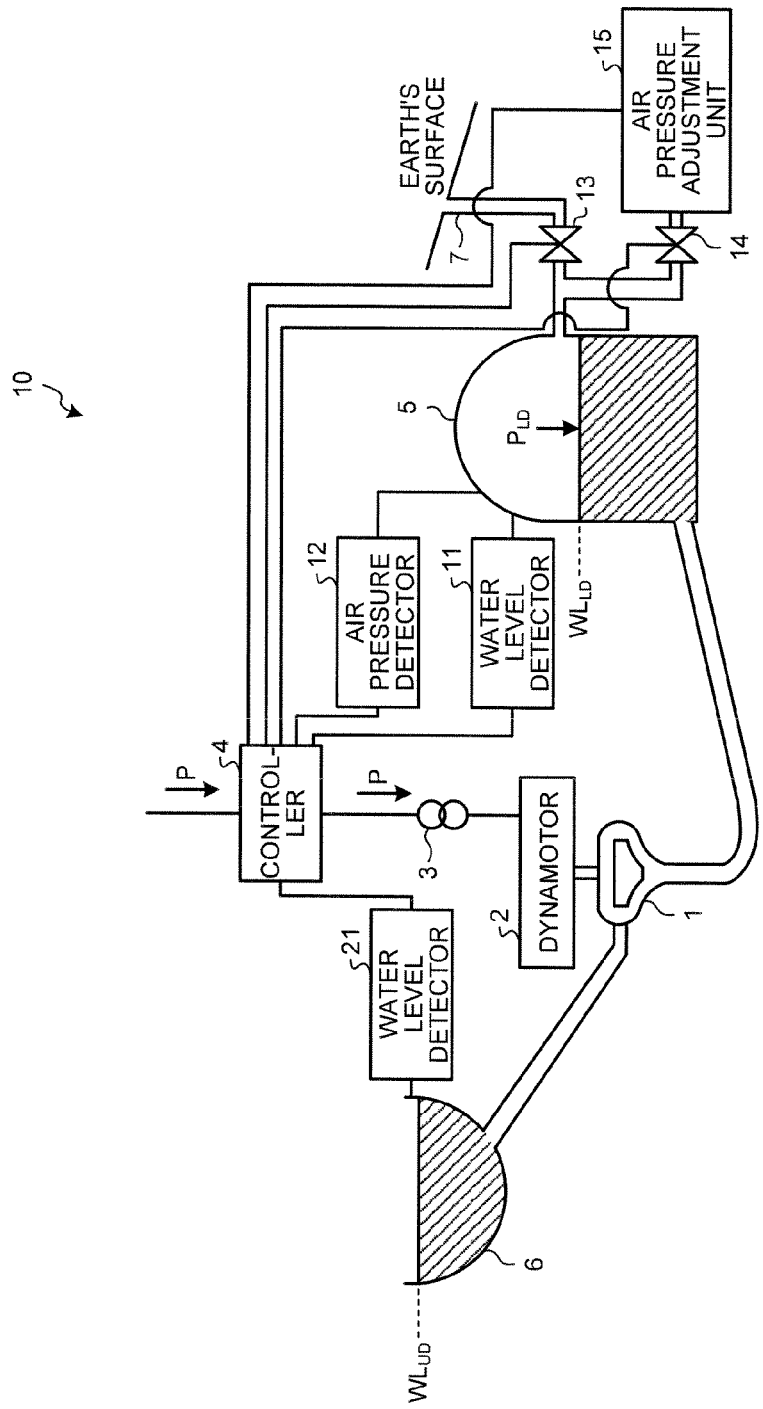
FIG. 1 is a diagram illustrating a configuration example of a pumped storage power plant according to a first embodiment.

FIG. 1 is a diagram illustrating a configuration example of a bumped storage power plant 10 according to the present embodiment. The pumped storage power plant 10 is equipped with a pump turbine 1, a motor generator 2, a transformer 3, a controller 4, a lower regulating reservoir 5, an upper regulating reservoir 6, a ventilation tunnel 7, a water level detector 11, an air pressure detector 12, air pressure control valves 13 and 14, an air pressure adjustment unit 15, and a water level detector 21.

The pump turbine 1 is connected to the motor generator 2. In a power generation operation, the pump turbine 1 drives the motor generator 2 by water falling from the upper regulating reservoir 6. In a pumping operation, the pump turbine 1 is driven by the motor generator 2 to pump up water in the lower regulating reservoir 5 to the upper regulating reservoir 6. In the power generation operation, the motor generator 2 generates electric power by rotation of the pump turbine 1 and outputs the generated electric power to an external grid (not shown) through the transformer 3 and the controller 4. In the pumping operation, the motor generator 2 drives the pump turbine 1 by a pumping input P that is input from the external grid through the controller 4 and the transformer 3. The transformer 3 connects the motor generator 2 and the external grid through the controller 4.

The controller 4 controls an air pressure in the lower regulating reservoir 5 to control a water level difference (pump head) that acts on the pump turbine 1 during the pumping operation and is calculated based on a water level of the lower regulating reservoir 5 and a water level of the upper regulating reservoir 6. It should be noted that the present embodiment is configured such that the controller 4 receives the pumping input P from the external grid and outputs the pumping input P to the transformer 3. However, the configuration is not limited to that. Any configuration is possible as long as the controller 4 can obtain information of the pumping input P. For example, the transformer 3 may be connected to the external grid and the controller 4 may obtain the information of the pumping input P through a branched line from between the external grid and the transformer 3.

The lower regulating reservoir 5 has an upper space which is sealable. An air pressure of an air layer in the upper space of the lower regulating reservoir 5 is adjustable by operations of the air pressure control valves 13 and 14 and the air pressure adjustment unit 15. The lower regulating reservoir 5 is located at a position geographically lower than the upper regulating reservoir 6. As to the upper regulating reservoir 6, a water surface thereof is in contact with (open to) the atmosphere. The upper regulating reservoir 6 is located at a position geographically higher than the lower regulating reservoir 5. The ventilation tunnel 7 connects the lower regulating reservoir 5 and the atmosphere on the Earth's surface through the air pressure control valve 13. The water level detector 11 detects a level of water stored in the lower regulating reservoir 5. The air pressure detector 12 detects the air pressure of the air layer in the upper space of the lower regulating reservoir 5. The air pressure control valve 13 controls the connection between the lower regulating reservoir 5 and the atmosphere on the Earth's surface. The air pressure control valve 14 controls a connection between the lower regulating reservoir 5 and the air pressure adjustment unit 15. The air pressure adjustment unit 15 adjusts, through the air pressure control valve 14, the air pressure of the air layer in the upper space of the lower regulating reservoir 5. The water level detector 21 detects a level of water stored in the upper regulating reservoir 6.

Next, an operation of the pumped storage power plant 10 in the case of the pumping operation will be described. In order to perform the pumping operation, the pumped storage power plant 10 receives the supply of power (pumping input P) from the connected external grid. The pumped storage power plant 10 supplies the pumping input P to the motor generator 2 through the controller 4 and the transformer 3. The motor generator 2 serving as an electronic motor drives the pump turbine 1 by the pumping input P to pump up the water from the lower regulating reservoir 5 to the upper regulating reservoir 6. In this manner, the pumped storage bower plant 10 can convert an electrical energy being the pumping input P into a potential energy of water and thus store the energy.

Figure 2:
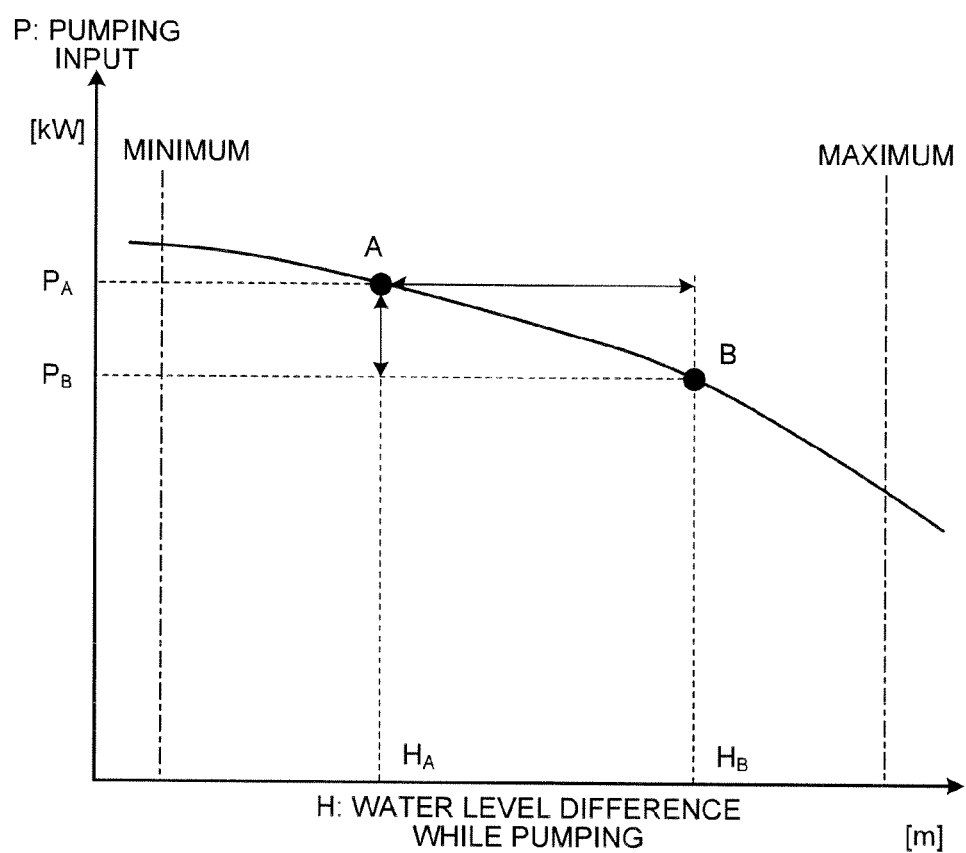
FIG. 2 is a diagram illustrating a relation between a water level difference at a pumping operation and a pumping input in a pump turbine.

Let us explain a characteristic of the pump turbine 1. FIG. 2 is a diagram illustrating a relation between a water level difference at the pumping operation and the pumping input in the pump turbine. At the time of the pumping operation, the pump turbine 1 consumes an electrical energy of the pumping input P represented by a curve and corresponding to a water level difference H within a range from the minimum to the maximum as shown in FIG. 2. For example, the pump turbine 1 in the pumped storage power plant 10 consumes a pumping input $P_A$ in a case of a water level difference $H_A$ indicated by a point A, and consumes a pumping input $P_B$ in a case of a water level difference $H_B$ indicated by a point B.

The pumping operation is generally performed during hours (for example, midnight or the like) when the power consumption by the consumers is low. At this time, the external grid such as a thermal power plant connected to the pumped storage power plant 10 does not completely stop the power generation operation but continuously supplies power by performing the power generation operation. However, in the low power consumption hours, an amount of the power generated by the external grid is more than that consumed by the consumers. Therefore, the external grid outputs, as the pumping input to the pumped storage power plant 10, a difference between the generated power and the power consumed by the consumers. The pumped storage power plant 10 consumes the pumping input received from the external grid by performing the pumping operation. It is thus possible to achieve a stable operation of a system including the external grid and the pumped storage power plant 10.

Here, as described using FIG. 2, the relationship between the water level difference H at the pumping operation and the pumping input P in the pumped storage power plant 10 is uniquely determined by the characteristic of the pump turbine 1. Therefore, for example, in the case of the water level difference $H_B$, the pumped storage power plant 10 can only consume the electrical energy of the pumping input $P_B$ at most even when the pumping input $P_A$ is input as the pumping input P, which inhibits the stable operation of the system. Also for example, in the case of the water level difference $H_A$, the pumped storage power plant 10 cannot receive the necessary pumping input $P_A$ if only the pumping input $P_B$ is input as the pumping input P, which causes deterioration of an operation efficiency. Therefore, according to the present embodiment, the pumped storage power plant 10 is configured to be capable of adjusting the water level difference H between the upper regulating reservoir 6 and the lower regulating reservoir 5 from a viewpoint of a pressure applied to each regulating reservoir, without requiring movement of the water. The adjusted water level difference H is the water level difference (pump head) actually acting on the pump turbine 1 during the actual pumping operation.

With regard to the pumped storage power plant 10 shown in FIG. 1, the water level of the upper regulating reservoir 6 is $WL_{UD}$ (m; above sea level), the water level of the lower regulating reservoir 5 is $WL_{LD}$ (m; above sea level), and the air pressure in the upper space of the lower regulating reservoir 5 and acting on the lower regulating reservoir 5 is $P_{LD}$ (MPa). In this case, the water level difference H (m) can be expressed by the following formula (1).

$$H = WL_{UD} - (WL_{LD} + 101.97 \times P_{LD}) \quad (1)$$

With regard to the lower regulating reservoir 5 whose upper space is sealed, the controller 4 can calculate a regulating reservoir calculation water level as ($WL_{LD}$+101.97×$P_{LD}$) by using the water level $WL_{LD}$ and the air pressure $P_{LD}$ of the lower regulating reservoir 5. Here, it is possible to adjust the air pressure $P_{LD}$ in the lower regulating reservoir 5 by the control by the controller 4. Specifically, the controller 4 can adjust the air pressure $P_{LD}$ by closing the air pressure control valve 13, opening the air pressure control valve 14, and controlling the air pressure adjustment unit 15 to compress or expand the air. It is also possible to set the air pressure $P_{LD}$ in the lower regulating reservoir 5 to be equivalent to the atmospheric pressure on the Earth's surface by opening the air pressure control valve 13.

The controller 4 obtains information of the water level $WL_{UD}$ of the upper regulating reservoir 6 from the water level detector 21, information of the water level $WL_{LD}$ of the lower regulating reservoir 5 from the water level detector 11, information of the air pressure $P_{LD}$ in the upper space of the lower regulating reservoir 5 from the air pressure detector 12, and information of the pumping input P from the external grid. A desired water level difference corresponding to the pumping input P can be determined by the characteristic shown in FIG. 2. The controller 4 controls opening and closing of the air pressure control valves 13 and 14 and the compression and expansion of the air by the air pressure adjustment unit 15 to adjust the air pressure $P_{LD}$ in the lower regulating reservoir 5 such that the water level difference H (see the formula (1)) becomes the above-mentioned desired water level. It should be noted that the operating characteristic of the pump turbine 1 as illustrated in FIG. 2 is known and set in the controller 4.

For example, let us consider the following case. At first, the pumped storage power plant 10 performs the pumping operation at the state indicated by the point A in FIG. 2. In this case, the water level difference $H_A$ is in the desired state with respect to the pumping input $P_A$, and thus the pump turbine 1 can perform the pumping operation at a high efficiency. After that, the water level $WL_{UD}$ of the upper regulating reservoir 6 increases and the water level $WL_{LD}$ of the lower regulating reservoir 5 decreases, since the pump turbine 1 pumps up the water from the lower regulating reservoir 5 to the upper regulating reservoir 6. The water level difference H becomes larger and changes to the water level difference $H_B$. In this case, however, the pumped storage power plant 10 can consume only an electrical energy of the pumping input $P_B$ even though the pumping input $P_A$ is input to the pumped storage power plant 10.

Therefore, the controller 4 of the pumped storage power plant 10 obtains the information of the water level $WL_{UD}$, the water level $WL_{LD}$, the air pressure $P_{LD}$, and the pumping input $P_A$, and controls the air pressure control valves 13 and 14 and the air pressure adjustment unit 15 to adjust the air pressure $P_{LD}$ such that the water level difference H calculated by the above-mentioned formula (1) becomes the desired water level difference $H_A$. More specifically, in the case where the water level difference H changes from the water level difference $H_A$ to the water level difference $H_B$ and the pumping input P is maintained at the pumping input $P_A$ without change, the controller 4 controls the air pressure control valves 13 and 14 and the air pressure adjustment unit 15 to increase the air pressure $P_{LD}$ to be higher than that at the beginning of the pumping operation.

In this manner, it is possible in the pumped storage power plant 10 to increase the value of ($WL_{LD}$+101.97×$P_{LD}$) by increasing the air pressure $P_{LD}$, even if the value of the water level $WL_{LD}$ increases and the value of the water level $WL_{LD}$ decreases in the formula (1). If the increase in the value of ($WL_{LD}$+101.97×$P_{LD}$) is equivalent to the increase in the value of the water level $WL_{UD}$, the value of the water level difference H calculated by the two values and the formula (1) can be adjusted to a value within a desired range. As a result, it is possible in the pumped storage power plant 10 to adjust the value of the water level difference H to the desired value determined depending on the pumping input P as shown in FIG. 2.

It should be noted that the controller 4 may always perform the control of adjusting the air pressure $P_{LD}$ in the lower regulating reservoir 5. Alternatively, the controller 4 may perform, at a predetermined time interval, the control of adjusting the air pressure $P_{LD}$ in the lower regulating reservoir 5 to provide hours during which no control and adjustment is carried our. Moreover, with regard to the operation characteristic shown in FIG. 2, the controller 4 may set an allowable range with respect to the desired water level difference H corresponding to the pumping input P. In this case, the controller 4 performs the control of adjusting the air pressure $P_{LD}$ in the lower regulating reservoir 5 when the water level difference H becomes out of the allowable range corresponding to the pumping input P. It is thus possible in the pumped storage power plant 10 to reduce consumption of an electrical energy required for controlling and adjusting the air pressure $P_{LD}$ in the lower regulating reservoir 5, for example, an electrical energy required for operating the air pressure adjustment unit 15.

It should be noted that the present embodiment is not limited to the above-described case where the water level difference H is changed due to the pumping operation and then the air pressure $P_{LD}$ in the lower regulating reservoir 5 is adjusted. It is assumed that the pumping input P to be input from the external grid is not necessarily constant but can change. Therefore, even if the water level difference H does not vary due to the pumping operation, the pumped storage power plant 10 adjusts the air pressure $P_{LD}$ in the lower regulating reservoir 5 such that the desired water level difference H corresponding to the varying pumping input P as shown in FIG. 2 can be obtained. More specifically, in a case where the pumping input P increases, the controller 4 of the pumped storage power plant 10 controls the air pressure control valves 13 and 14 and the air pressure adjustment unit 15 such that the water level difference H becomes smaller, that is, the air pressure $P_{LD}$ in the lower regulating reservoir 5 becomes higher than that before the change in the pumping input P. On the other hand, in a case where the pumping input P decreases, the controller 4 of the pumped storage power plant 10 controls the air pressure control valves 13 and 14 and the air pressure adjustment unit 15 such that the water level difference H becomes larger, that is, the air pressure $P_{LD}$ in the lower regulating reservoir 5 becomes lower than that before the change in the pumping input P.

According to the pumped storage power plant 10 of the present embodiment, as described above, in the pumping operation, the controller 4 obtains the information of the water level $WL_{UD}$ of the upper regulating reservoir 6, the information of the water level $WL_{LD}$ of the lower regulating reservoir 5, the information of the air pressure $P_{LD}$ in the lower regulating reservoir 5, and the information of the pumping input P, and controls the air pressure control valves 13 and 14 and the air pressure adjustment unit 15 to adjust the air pressure $P_{LD}$ in the lower regulating reservoir 5 such that the water level difference H becomes the desired water level difference depending on the pumping input P. It is therefore possible in the pumped storage power plant 10 to increase or decrease the water level difference H (pump head) acting between the upper regulating reservoir 6 and the lower regulating reservoir 5 during the pumping operation as compared with the geographical water level difference. As a result, it is possible to control the value of the water level difference H to the desired state depending on the pumping input P and thus to carry out the pumping operation at an optimum pump head. Furthermore, it is possible to achieve the stable operation of the system including the pumped storage power plant 10 and the external grid that outputs the pumping input P.

It should be noted that the present embodiment is not limited to the above-described cases where the air pressure $P_{LD}$ in the lower regulating reservoir 5 is adjusted when the water level difference H or the pumping input P varies. The present embodiment is also applicable to other applications.

As shown in FIG. 2, the relationship between the desired water level difference and the pumping input is uniquely determined depending on the pump turbine 1 used in the pumped storage power plant 10. Here, the locations of the upper regulating reservoir 6 and the lower regulating reservoir 5 are determined by the geographical conditions in which the pumped storage power plant 10 is built. Therefore, a difference in the altitude of the location between the upper regulating reservoir 6 and the lower regulating reservoir 5 greatly varies depending on the geographical conditions, and in some cases it may be larger than the maximum value of the water level difference H shown in FIG. 2. In such a case, conventionally, the pump turbine 1 as shown in FIG. 2 cannot be used and it is thus required to use a pump turbine of another type. In this case, it may not be possible to use a cheap and reliable facility, or it may be required to use a multi-stage pump turbine.

According to the present embodiment, on the other hand, it is possible to decrease the water level difference H calculated from the water level and the air pressure, by adjusting the air pressure $P_{LD}$ in the lower regulating reservoir 5, without adjusting the geographical locations of the respective regulating reservoirs. In another word, it is possible to decrease the water level difference H (pump head) acting at the time of the pumping operation, even when there is actually a large difference in the geographical water level between the respective regulating reservoirs. It is thus possible to select a cheap and reliable type equipment for such an equipment as the pump turbine selected depending on the water level difference.

Second Embodiment

In a second embodiment, a pumped storage power plant that can also adjust the air pressure in the upper regulating reservoir will be described. An overlapping description with the first embodiment will be omitted as appropriate.

Figure 3:
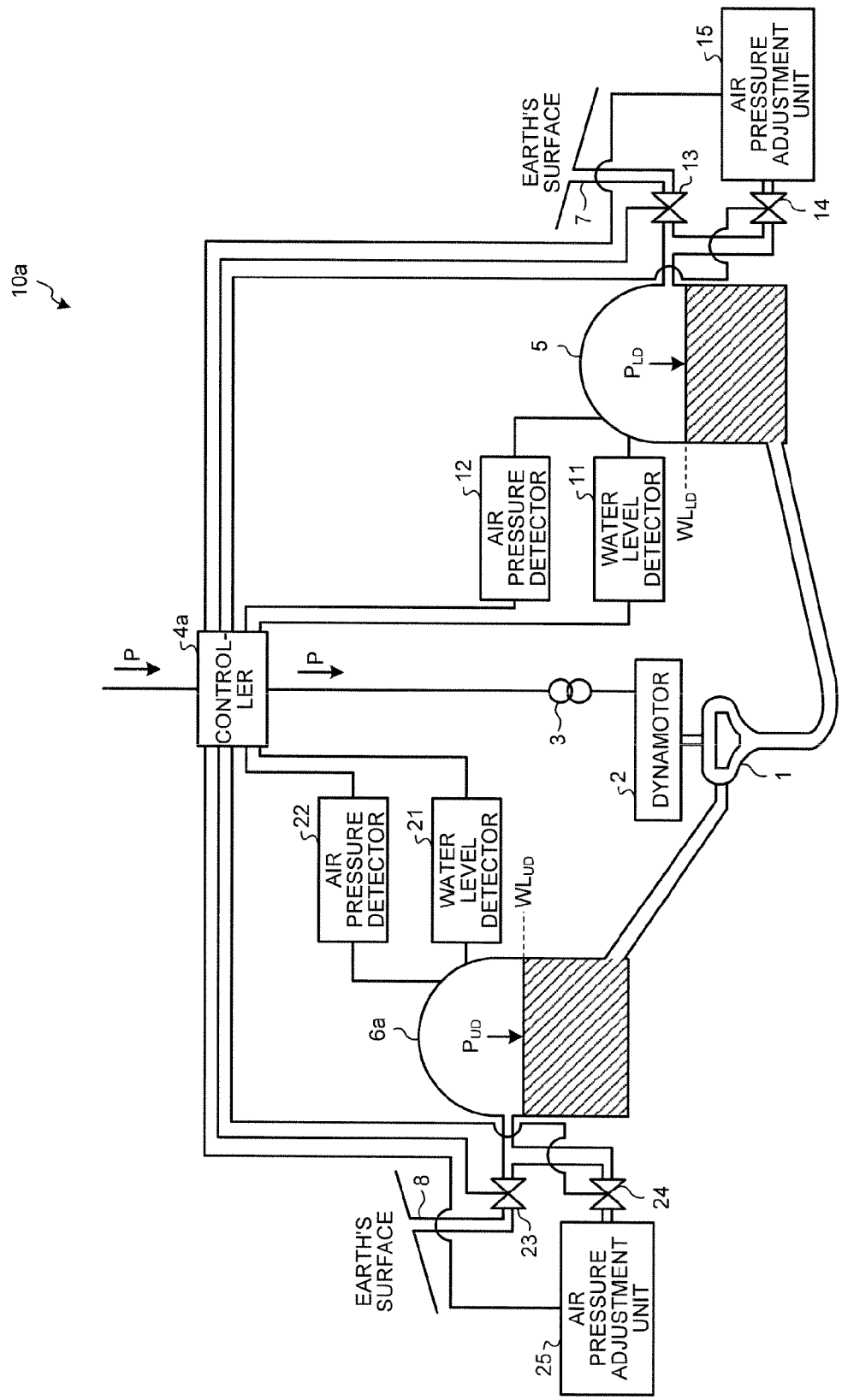
FIG. 3 is a diagram illustrating a configuration example of a pumped storage power plant according to a second embodiment.

FIG. 3 is a diagram illustrating a configuration example of a pumped storage power plant 10a according to the present embodiment. The pumped storage power plant 10a is equipped with the pump turbine 1, the motor generator 2, the transformer 3, a controller 4a, the lower regulating reservoir 5, an upper regulating reservoir 6a, ventilation tunnels 7 and 8, the water level detector 11, the air pressure detector 12, the air pressure control valves 13 and 14, the air pressure adjustment unit 15, a water level detector 21, an air pressure detector 22, air pressure control valves 23 and 24, and an air pressure adjustment unit 25.

The controller 4a controls respective air pressures in the lower regulating reservoir 5 and the upper regulating reservoir 6a to control a water level difference (pump head) that acts on the pump turbine 1 during the pumping operation and is calculated based on a water level of the lower regulating reservoir 5 and a water level of the upper regulating reservoir 6a. The upper regulating reservoir 6a has an upper space which is sealable. An air pressure of an air layer in the upper space of the upper regulating reservoir 6a is adjustable by operations of the air pressure control valves 23 and 24 and the air pressure adjustment unit 25. The upper regulating reservoir 6a is located at a position geographically higher than the lower regulating reservoir 5. The ventilation tunnel 8 connects the upper regulating reservoir 6a and the atmosphere on the Earth's surface through the air pressure control valve 23. The water level detector 21 detects a level of water stored in the upper regulating reservoir 6a. The air pressure detector 22 detects the air pressure of the air layer in the upper space of the upper regulating reservoir 6a. The air pressure control valve 23 controls the connection between the upper regulating reservoir 6a and the atmosphere on the Earth's surface. The air pressure control valve 24 controls a connection between the upper regulating reservoir 6a and the air pressure adjustment unit 25. The air pressure adjustment unit 25 adjusts, through the air pressure control valve 24, the air pressure of the air layer in the upper space of the upper regulating reservoir 6a.

Next, an operation of the pumped storage power plant 10a in the case of the pumping operation will be described. In the above-mentioned first embodiment, when the water level difference H changes due to the pumping operation, or when the pumping input P changes, the controller 4 controls the air pressure control valves 13 and 14 and the air pressure adjustment unit 15 to adjust the air pressure $P_{LD}$ in the lower regulating reservoir 5. In the present embodiment, an air pressure $P_{UD}$ in the upper regulating reservoir 6a is adjusted as well.

With regard to the pumped storage power plant 10a shown in FIG. 3, the water level of the upper regulating reservoir 6a is $WL_{UD}$ (m; above sea level), the air pressure in the upper space of the upper regulating reservoir 6a and acting on the upper regulating reservoir 6a is $P_{UD}$ (MPa), the water level of the lower regulating reservoir 5 is $WL_{LD}$ (m; above sea level), and the air pressure in the upper space of the lower regulating reservoir 5 and acting on the lower regulating reservoir 5 is $P_{LD}$ (MPa). In this case, the water level difference H (m) can be expressed by the following formula (2).

$$H=(WL_{UD}+101.97 \times P_{UD})-(WL_{LD}+101.97 \times P_{LD}) \qquad (2)$$

With regard to the upper regulating reservoir 6a whose upper space is sealed, the controller 4a can calculate a regulating reservoir calculation water level as ($WL_{UD}$+ 101.97×$P_{UD}$) by using the water level $WL_{UD}$ and the air pressure $P_{UD}$ of the upper regulating reservoir 6a. Here, it is possible to adjust the air pressure $P_{UD}$ in the upper regulating reservoir 6a by the control by the controller 4a. Specifically, the controller 4a can adjust the air pressure $P_{UD}$ by closing the air pressure control valve 23, opening the air pressure control valve 24, and controlling the air pressure adjustment unit 25 to compress or expand the air. It is also possible to set the air pressure $P_{UD}$ in the upper regulating reservoir 6a to be equivalent to the atmospheric pressure on the Earth's surface by opening the air pressure control valve 23. It should be noted that the adjustment of the air pressure $P_{LD}$ with respect to the lower regulating reservoir 5 by the controller 4a is the same as that by the controller 4.

The controller 4a obtains information of the water level $WL_{UD}$ of the upper regulating reservoir 6a from the water level detector 21, information of the air pressure $P_{UD}$ in upper space of the upper regulating reservoir 6a from the air pressure detector 22, information of the water level $WL_{LD}$ of the lower regulating reservoir 5 from the water level detector 11, information of the air pressure $P_{LD}$ in the upper space of the lower regulating reservoir 5 from the air pressure detector 12, and information of the pumping input P from the external grid. The controller 4a controls opening and closing of the air pressure control valves 23 and 24 and the compression and expansion of the air by the air pressure adjustment unit 25 to adjust the air pressure $P_{UD}$ in the upper regulating reservoir 6a, and controls opening and closing of the air pressure control valves 13 and 14 and the compression and expansion of the air by the air pressure adjustment unit 15 to adjust the air pressure $P_{LD}$ in the lower regulating reservoir 5, such that the water level difference H (see the formula (2)) becomes the desired water level with respect to the pumping input P. It should be noted that the operating characteristic of the pump turbine 1 as illustrated in FIG. 2 is known and set in the controller 4a.

For example, let us consider the following case. At first, the pumped storage power plant 10a performs the pumping operation at the state indicated by the point A in FIG. 2. In this case, the water level difference $H_A$ is in the desired state with respect to the pumping input $P_A$, and thus the pump turbine 1 can perform the pumping operation at a high efficiency. After that, the water level $WL_{UD}$ of the upper regulating reservoir 6a increases and the water level $WL_{LD}$ of the lower regulating reservoir 5 decreases, since the pump turbine 1 pumps up the water from the lower regulating reservoir 5 to the upper regulating reservoir 6a. The water level difference H becomes larger and changes to the water level difference $H_B$. In this case, however, the pumped storage power plant 10a can consume only an electrical energy of the pumping input $P_B$ even though the pumping input $P_A$ is input to the pumped storage power plant 10a.

Therefore, the controller 4a of the pumped storage power plant 10a obtains the information of the water level $WL_{UD}$, the air pressure $P_{UD}$, the water level $WL_{LD}$, the air pressure $P_{LD}$, and the pumping input $P_A$, controls the air pressure control valves 23 and 24 and the air pressure adjustment unit 25 to adjust the air pressure $P_{UD}$, and controls the air pressure control valves 13 and 14 and the air pressure adjustment unit 15 to adjust the air pressure $P_{LD}$ such that the water level difference H calculated by the above-mentioned formula (2) becomes the desired water level difference $H_A$. More specifically, in the case where the water level difference H changes from the water level difference $H_A$ to the water level difference $H_E$, and the pumping input P is maintained at the pumping input $P_A$ without, change, the controller 4a controls the air pressure control valves 23 and 24 and the air pressure adjustment unit 25 to decrease the air pressure $P_{UD}$ to be lower than that at the beginning of the pumping operation, and controls the air pressure control valves 13 and 14 and the air pressure adjustment unit 15 to increase the air pressure $P_{LD}$ to be higher than that at the beginning of the pumping operation.

Thus, in the pumped storage power plant 10a, in the formula (2), even if the value of the water level $WL_{UD}$ increases and the value of $WL_{LD}$ decreases, it is possible by decreasing the air pressure $P_{UD}$ and increasing the air pressure $P_{LD}$ to substantially equalize an amount of change in the value of $(WL_{UD}+101.97 \times P_{UD})$ and an amount of change in the value of $(WL_{LD}+101.97 \times P_{LD})$. If the amount of change in the value of $(WL_{UD}+101.97 \times P_{UD})$ is equivalent to the amount of change in the value of $(WL_{LD}+101.97 \times P_{LD})$, the value of the water level difference H calculated by the two values and the formula (2) can be adjusted to a value within a desired range. As a result, it is possible in the pumped storage power plant 10a to adjust the value of the water level difference H to the desired value determined depending on the pumping input P as shown in FIG. 2.

According to the pumped storage power plant 10a of the present embodiment, by adjusting the air pressure in the upper regulating reservoir 6a as well as the air pressure in the lower regulating reservoir 5, it is possible to control the water level difference H within a larger range which cannot be achieved in the case where the air pressure in only one of the regulating reservoirs is adjusted. Furthermore, according to the pumped storage power plant 10a, by concurrently adjusting the respective air pressures in the two regulating reservoirs, the adjustment to the desired water level difference can be achieved faster than the case where the air pressure in only one of the regulating reservoirs is adjusted.

A frequency of adjusting the air pressure in each regulating reservoir by the controller 4a may be designed to be similar to that by the controller 4 in the first embodiment.

According to the pumped storage power plant 10a of the present embodiment, as described above, in the pumping operation, the controller 4a obtains the information of the water level $WL_{UD}$ of the upper regulating reservoir 6a, the information of the air pressure $P_{UD}$ in the upper regulating reservoir 6a, the information of the water level $WL_{LD}$ of the lower regulating reservoir 5, the information of the air pressure $P_{LD}$ in the lower regulating reservoir 5, and the information of the pumping input P, controls the air pressure control valves 23 and 24 and the air pressure adjustment unit 25 to adjust the air pressure $P_{UD}$ in the upper regulating reservoir 6a, and controls the air pressure control valves 13 and 14 and the air pressure adjustment unit 15 to adjust the air pressure $P_{LD}$ in the lower regulating reservoir 5 such that the water level difference H becomes the desired water level difference depending on the pumping input P. As a result, it is possible according to the pumped storage power plant 10a to adjust the water level difference H depending on the pumping input P in a wider range than the first embodiment, and to control the value of the water level difference H to the desired state to carry out the pumping operation at an optimum pump head.

A difference in the altitude of the location between the upper regulating reservoir 6a and the lower regulating reservoir 5 greatly varies depending on the geographical conditions in which the pumped storage power plant 10a is built, and in some cases it may be larger than the maximum value of the water level difference H shown in FIG. 2. The present embodiment can be applied to such the case, as in the first embodiment. Moreover, the present embodiment can be applied to a case where the difference in the altitude of the geographical location between the upper regulating reservoir 6a and the lower regulating reservoir 5 is still larger as compared with that in the first embodiment.

In the present embodiment, the air pressures in the respective two regulating reservoirs, namely, the upper regulating reservoir 6a and the lower regulating reservoir 5 are adjusted. Instead, it is also possible to adjust only the air pressure in the lower regulating reservoir 5. In this case, the same effects as in the first embodiment can be obtained.

In the case where the air pressure in only one of the two regulating reservoirs is adjusted, the one regulating reservoir is not limited to the lower regulating reservoir 5. It is also possible to adjust only the air pressure in the upper regulating reservoir 6a. Even in this case, the same effects as in the first embodiment can be obtained. In this case, when the water level difference H is increased due to the pumping operation, the controller 4a performs the control such that the air pressure in the upper space of the upper regulating reservoir 6a is decreased to be lower than that at the beginning of the pumping operation. It should be noted that in the case where only the air pressure in the upper regulating reservoir 6a is adjusted, a configuration similar to that in the first embodiment is also possible, wherein only the upper regulating reservoir 6a is configured to have the upper space whose air pressure can be adjusted while the water surface of the lower regulating reservoir 5 is in contact with (open to) the atmosphere.

Third Embodiment

The operations in the case of the pumping operation has been described in the first and second embodiments. In a third embodiment, an operation in a case of a power generation operation will be described.

As an example, the description will be given with reference to the pumped storage power plant 10 illustrated in FIG. 1. In the pumped storage power plant 10, as in the case of the pumping operation, there is a desired operation state that can achieve a high power generation efficiency at the time of the power generation operation in the pump turbine 1. The desired operation state is determined by a water level difference (drop) from the upper regulating reservoir 6 to the lower regulating reservoir 5. In the pumped storage power plant 10, by controlling the air pressure in the lower regulating reservoir 5 to adjust the water level difference (drop) acting on the pump turbine 1 to a certain water level difference corresponding to the high operation efficiency, it is possible to perform the power generation operation in an optimum operation state. It should be noted that a power generation flow rate of the water falling the pump turbine 1 from the upper regulating reservoir 6 is constant.

For example, even if the power generation operation is performed at a water level difference with the high operation efficiency in the pump turbine 1 of the pumped storage power plant 10, the water level difference between the two regulating reservoirs decreases due to dropping of the water from the upper regulating reservoir 6 to the lower regulating reservoir 5. Therefore, in the pumped storage power plant 10, the controller 4 obtains the information of the water level $WL_{UD}$, the water level $WL_{LD}$, and the air pressure $P_{LD}$, and controls the air pressure control valves 13 and 14 and the air pressure adjustment unit 15 to adjust the air pressure $P_{LD}$ such that the water level difference calculated by the formula (1) becomes a desired water level difference where the high operation efficiency in the pump turbine 1 can be achieved. More specifically, the controller 4 controls the air pressure control valves 13 and 14 and the air pressure adjustment unit 15 such that the air pressure $P_{LD}$ is decreased to be lower than that at a beginning of the power generation operation.

As in the case of the first embodiment, it is possible in the pumped storage power plant 10 to calculate, by using the formula (1), the water level difference between the upper regulating reservoir 6 and the lower regulating reservoir 5. It is thus possible in the pumped storage power plant 10 to decrease the value of $(WL_{LD}+101.97 \times P_{LD})$ by decreasing the air pressure $P_{LD}$, even if the value of the water level $WL_{LD}$ decreases and the value of the water level $WL_{LD}$ increases in the formula (1). If the decrease in the value of $(WL_{LD}+101.97 \times P_{LD})$ is equivalent to the decrease in the value of the water level $WL_{UD}$, the value of the water level difference H calculated by the two values and the formula (1) can be adjusted to a value within a desired range. As a result, in the pumped storage power plant 10, it is possible to adjust the water level difference H to the desired water level difference which can achieve the high operation efficiency in the pump turbine 1 and thus to perform the power generation operation in an optimum operating state.

During the power generation operation, the controller 4 controls the air pressure control valves 13 and 14 and the air pressure adjustment unit 15 such that the air pressure $P_{LD}$ is decreased to be lower than that at the beginning of the power generation operation. During the pumping operation, on the other hand, the controller 4 controls the air pressure control valves 13 and 14 and the air pressure adjustment unit 15 such that the air pressure $P_{LD}$ is increased to be higher than that at the beginning of the pumping operation.

As in the case of the first embodiment, the controller 4 may always perform the control of adjusting the air pressure $P_{LD}$ in the lower regulating reservoir 5. Alternatively, the controller 4 may perform, at a predetermined time interval, the control of adjusting the air pressure $P_{LD}$ in the lower regulating reservoir 5 to provide hours during which no control and adjustment is carried out. Moreover, the controller 4 may set an allowable range with respect to the desired water level difference corresponding to the desired target operation efficiency. In this case, the controller 4 performs the control of adjusting the air pressure $P_{LD}$ in the lower regulating reservoir 5 when the water level difference becomes out of the allowable range. It is thus possible in the pumped storage power plant 10 to reduce consumption of an electrical energy required for controlling and adjusting the air pressure $P_{LD}$ in the lower regulating reservoir 5, for example, an electrical energy required for operating the air pressure adjustment unit 15.

It should be noted that the present embodiment is not limited to the configuration shown in FIG. 1. The present embodiment can be also applied to the configuration of the pumped storage power plant 10a of the second embodiment as shown in FIG. 3.

For example, even if the power generation operation is performed at a water level difference with the high operation efficiency in the pump turbine 1 of the pumped storage power plant 10a, the water level difference between the two regulating reservoirs decreases due to dropping of the water from the upper regulating reservoir 6a to the lower regulating reservoir 5. Therefore, in the pumped storage power plant 10a, the controller 4a obtains the information of the water level $WL_{UD}$, the air pressure $P_{UD}$, the water level $WL_{LD}$, and the air pressure $P_{LD}$, controls the air pressure control valves 23 and 24 and the air pressure adjustment unit 25 to adjust the air pressure $P_{UD}$, and controls the air pressure control valves 13 and 14 and the air pressure adjustment unit 15 to adjust the air pressure $P_{LD}$ such that the water level difference calculated by the above-mentioned formula (2) becomes the desired water level difference that can achieve the high operation efficiency in the pump turbine 1. More specifically, the controller 4a controls the air pressure control valves 23 and 24 and the air pressure adjustment unit 25 to increase the air pressure $P_{UD}$, and controls the air pressure control valves 13 and 14 and the air pressure adjustment unit 15 to decrease the air pressure $P_{LD}$.

As in the case of the second embodiment, it is possible in the pumped storage power plant 10a to calculate, by using the above-mentioned formula (2), the water level difference between the upper regulating reservoir 6a and the lower regulating reservoir 5. Thus, in the pumped storage power plant 10a, in the formula (2), even if the value of the water level $WL_{UD}$ decreases and the value of $WL_{LD}$ increases, it is Possible by increasing the air pressure $P_{UD}$ and decreasing the air pressure $P_{LD}$ to substantially equalize an amount of change in the value of $(WL_{UD}+101.97 \times P_{UD})$ and an amount of change in the value of ($WL_{LD}+101.97 \times P_{LD}$). If the amount of change in the value of ($WL_{LD}+101.97 \times P_{UD}$) is equivalent to the amount of change in the value of ($WL_{LD}+101.97 \times P_{LD}$), the value of the water level difference calculated by the two values and the formula (2) can be adjusted to a value within a desired range. As a result, in the pumped storage power plant 10a, it is possible to adjust the water level difference to the desired water level difference which can achieve the high operation efficiency in the pump turbine 1 and thus to perform the power generation operation in an optimum operating state.

A frequency of adjusting the air pressure in each regulating reservoir by the controller 4a may be designed to be similar to that by the controller 4 mentioned above.

According to the pumped storage power plant 10 of the present embodiment, as described above, in the power generation operation, the controller 4 obtains the information of the water level $WL_{UD}$ of the upper regulating reservoir 6, the information of the water level $WL_{LD}$ of the lower regulating reservoir 5, and the information of the air pressure $P_{LD}$ in the lower regulating reservoir 5, and controls the air pressure control valves 13 and 14 and the air pressure adjustment unit 15 to adjust the air pressure $P_{LD}$ in the lower regulating reservoir 5 such that the water level difference (drop) acting on the pump turbine 1 to a desired water level difference that can achieve the high operation efficiency in the pump turbine 1. In this manner, in the pumped storage power plant 10, it is possible to control the water level difference to the desired water level difference and thus to perform the power generation operation in an optimum drop state.

In addition, according to the pumped storage power plant 10a, in the power generation operation, the controller 4a obtains the information of the water level $WL_{UD}$ of the upper regulating reservoir 6a, the information of the air pressure $P_{UD}$ in the upper regulating reservoir 6a, the information of the water level $WL_{LD}$ of the lower regulating reservoir 5, and the information of the air pressure $P_{LD}$ in the lower regulating reservoir 5, controls the air pressure control valves 23 and 24 and the air pressure adjustment unit 25 to adjust the air pressure $P_{UD}$ in the upper regulating reservoir 6a, and controls the air pressure control valves 13 and 14 and the air pressure adjustment unit 15 to adjust the air pressure $P_{LD}$ in the lower regulating reservoir 5 such that the water level difference (drop) acting on the pump turbine 1 to a desired water level difference that can achieve the high operation efficiency in the pump turbine 1. In this manner, in the pumped storage power plant 10a, it is possible to control the water level difference to the desired water level difference and thus to perform the power generation operation in an optimum drop state.

As described above, the pumped storage power plant according to the embodiments of the present invention is useful for the pumping operation and the power generation operation using two regulating reservoirs having the different geographical water level conditions. In particular, the pumped storage power plant according to the embodiments of the present invention is suitable for a case in which one of the regulating reservoirs is in the sealed geographical condition.

What is claimed is:

1. A pumped storage power plant that performs a pumping operation by using a pump turbine, an upper regulating reservoir, and a lower regulating reservoir located at a position geographically lower than the upper regulating reservoir, wherein an upper space of one of the upper regulating reservoir and the lower regulating reservoir is sealable, the pumped storage power plant comprising:
an air pressure adjustment unit configured to adjust an air pressure in the upper space of the one regulating reservoir;
a first water level detector configured to detect a first water level of the one regulating reservoir;
an air pressure detector configured to detect the air pressure in the upper space of the one regulating reservoir;
a second water level detector configured to detect a second water level of other of the upper regulating reservoir and the lower regulating reservoir; and
a controller configured to:
obtain information of the first water level from the first water level detector, information of the air pressure from the air pressure detector, information of the second water level from the second water level detector, and information of a pumping input that is an electrical energy input from an external grid and used during the pumping operation;
set a water level calculated by using the first water level and the air pressure, as a regulating reservoir calculation water level of the one regulating reservoir; and
control the air pressure adjustment unit to adjust the air pressure such that a water level difference between the second water level and the regulating reservoir calculation water level becomes a desired water level difference that is determined by a characteristic of the pump turbine depending on the pumping input.

2. The pumped storage power plant according to claim 1, wherein when the pumping input changes, the controller controls the air pressure adjustment unit to adjust the air pressure such that the desired water level difference depending on the pumping input after the change is achieved.

3. The pumped storage power plant according to claim 1, wherein the controller sets an allowable range with respect to the desired water level difference, and
wherein when the water level difference between the second water level and the regulating reservoir calculation water level becomes out of the allowable range, the controller controls the air pressure adjustment unit to adjust the air pressure such that the desired water level difference is achieved.

4. The pumped storage power plant according to claim 1, wherein the controller controls, at a predetermined time interval, the air pressure adjustment unit to adjust the air pressure such that the water level difference between the second water level and the regulating reservoir calculation water level becomes the desired water level difference.

5. The pumped storage power plant according to claim 1, wherein the lower regulating reservoir is the one regulating reservoir and the upper regulating reservoir is the other regulating reservoir,
wherein when the pumping operation causes a water level difference between a water level of the upper regulating reservoir and a water level of the lower regulating reservoir to be larger than that at a beginning of the pumping operation, the controller controls the air pressure adjustment unit to increase the air pressure in the upper space of the lower regulating reservoir to be higher than that at the beginning of the pumping operation.

6. The pumped storage power plant according to claim 1,
wherein the upper regulating reservoir is the one regulating reservoir and the lower regulating reservoir is the other regulating reservoir,
wherein when the pumping operation causes a water level difference between a water level of the lower regulating reservoir and a water level of the upper regulating reservoir to be larger than that at a beginning of the pumping operation, the controller controls the air pressure adjustment unit to decrease the air pressure in the upper space of the upper regulating reservoir to be lower than that at the beginning of the pumping operation.

7. A pumped storage power plant that performs a pumping operation by using a pump turbine, an upper regulating reservoir, and a lower regulating reservoir located at a position geographically lower than the upper regulating reservoir, wherein an upper space of the upper regulating reservoir is sealable and an upper space the lower regulating reservoir is sealable,
the pumped storage power plant comprising:
an upper air pressure adjustment unit configured to adjust a first air pressure in the upper space of the upper regulating reservoir;
an upper water level detector configured to detect a first water level of the upper regulating reservoir;
an upper air pressure detector configured to detect the first air pressure in the upper space of the upper regulating reservoir;
a lower air pressure adjustment unit configured to adjust a second air pressure in the upper space of the lower regulating reservoir;
a lower water level detector configured to detect a second water level of the lower regulating reservoir;
a lower air pressure detector configured to detect the second air pressure in the upper space of the lower regulating reservoir;
a controller configured to:
obtain information of the first water level from the upper water level detector, information of the first air pressure from the upper air pressure detector, information of the second water level from the lower water level detector, information of the second air pressure from the lower air pressure detector, and information of a pumping input that is an electrical energy input from an external grid and used during the pumping operation;
set a water level calculated by using the first water level and the first air pressure, as an upper regulating reservoir calculation water level of the upper regulating reservoir;
set a water level calculated by using the second water level and the second air pressure, as a lower regulating reservoir calculation water level of the lower regulating reservoir; and
control the upper air pressure adjustment unit and the lower air pressure adjustment unit to respectively adjust the first air pressure and the second air pressure such that a water level difference between the upper regulating reservoir calculation water level and the lower regulating reservoir calculation water level becomes a desired water level difference that is determined by a characteristic of the pump turbine depending on the pumping input.

8. The pumped storage power plant according to claim 7, wherein when the pumping input changes, the controller controls the upper air pressure adjustment unit and the lower air pressure adjustment unit to respectively adjust the first air pressure and the second air pressure such that the desired water level difference depending on the pumping input after the change is achieved.

9. The pumped storage power plant according to claim 7, wherein the controller sets an allowable range with respect to the desired water level difference, and
wherein when the water level difference between the upper regulating reservoir calculation water level and the lower regulating reservoir calculation water level becomes out of the allowable range, the controller controls the upper air pressure adjustment unit and the lower air pressure adjustment unit to respectively adjust the first air pressure and the second air pressure such that the desired water level difference is achieved.

10. The pumped storage power plant according to claim 7, wherein the controller controls, at a predetermined time interval, the upper air pressure adjustment unit and the lower air pressure adjustment unit to respectively adjust the first air pressure and the second air pressure such that the water level difference between the upper regulating reservoir calculation water level and the lower regulating reservoir calculation water level becomes the desired water level difference.

11. The pumped storage power plant according to claim 7, wherein when the pumping operation causes the water level difference between the upper regulating reservoir calculation water level and the lower regulating reservoir calculation water level to be larger than that at a beginning of the pumping operation, the controller controls the upper air pressure adjustment unit to decrease the first air pressure to be lower than that at the beginning of the pumping operation and controls the lower air pressure adjustment unit to increase the second air pressure to be higher than that at the beginning of the pumping operation.

12. A pumped storage power plant that performs a power generation operation by using a pump turbine, an upper regulating reservoir, and a lower regulating reservoir located at a position geographically lower than the upper regulating reservoir, wherein an upper space of one of the upper regulating reservoir and the lower regulating reservoir is sealable,
the pumped storage power plant comprising:
an air pressure adjustment unit configured to adjust an air pressure in the upper space of the one regulating reservoir;
a first water level detector configured to detect a first water level of the one regulating reservoir;
an air pressure detector configured to detect the air pressure in the upper space of the one regulating reservoir;
a second water level detector configured to detect a second water level of other of the upper regulating reservoir and the lower regulating reservoir; and
a controller configured to:
obtain information of the first water level from the first water level detector, information of the air pressure from the air pressure detector, and information of the second water level from the second water level detector;
set a water level calculated by using the first water level and the air pressure, as a regulating reservoir calculation water level of the one regulating reservoir; and
control the air pressure adjustment unit to adjust the air pressure such that a water level difference between the second water level and the regulating reservoir calculation water level becomes a desired water level difference that is determined by a power generation characteristic of the pump turbine.

13. The pumped storage power plant according to claim 12,
wherein the controller sets an allowable range with respect to the desired water level difference, and
wherein when the water level difference between the second water level and the regulating reservoir calculation water level becomes out of the allowable range, the controller controls the air pressure adjustment unit to adjust the air pressure such that the desired water level difference is achieved.

14. The pumped storage power plant according to claim 12,
wherein the controller controls, at a predetermined time interval, the air pressure adjustment unit to adjust the air pressure such that the water level difference between the second water level and the regulating reservoir calculation water level becomes the desired water level difference.

15. The pumped storage power plant according to claim 12,
wherein the lower regulating reservoir is the one regulating reservoir and the upper regulating reservoir is the other regulating reservoir,
wherein when the power generation operation causes a water level difference between a water level of the upper regulating reservoir and a water level of the lower regulating reservoir to be smaller than that at a beginning of the power generation operation, the controller controls the air pressure adjustment unit to decrease the air pressure in the upper space of the lower regulating reservoir to be lower than that at the beginning of the power generation operation.

16. The pumped storage power plant according to claim 12,
wherein the upper regulating reservoir is the one regulating reservoir and the lower regulating reservoir is the other regulating reservoir,
wherein when the power generation operation causes a water level difference between a water level of the lower regulating reservoir and a water level of the upper regulating reservoir to be smaller than that at a beginning of the power generation operation, the controller controls the air pressure adjustment unit to increase the air pressure in the upper space of the upper regulating reservoir to be higher than that at the beginning of the power generation operation.

* * * * *